United States Patent Office 3,016,321
Patented Jan. 9, 1962

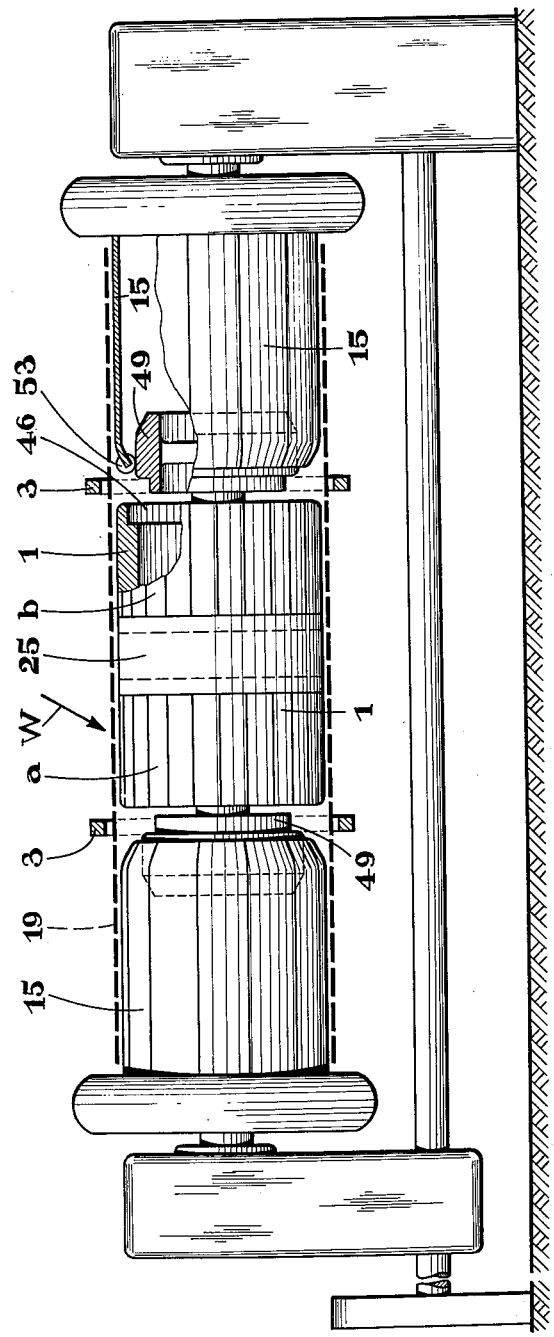

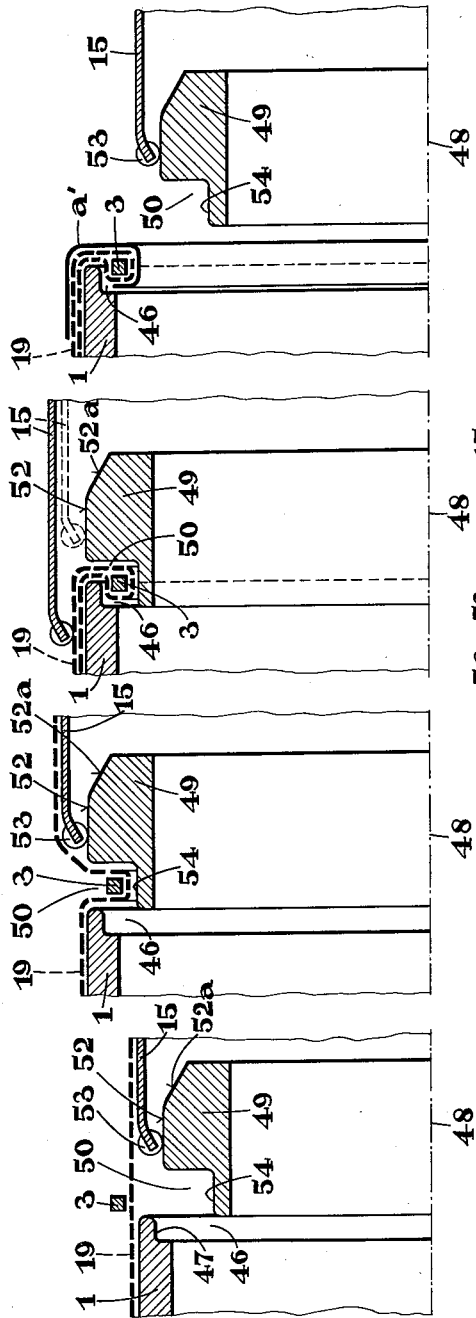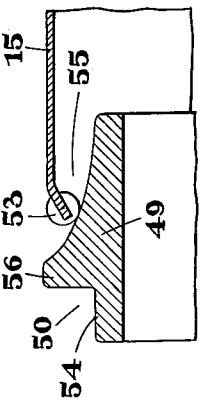

3,016,321
TIRE BUILDING MACHINE
Richard Beckadolph, Hannover, and Walter Niclas, Altwarmbuchen, Germany, assignors to Continental Gummi-Werke Aktiengesellschaft, Hannover, Germany
Filed Mar. 3, 1958, Ser. No. 718,721
Claims priority, application Germany Mar. 6, 1957
4 Claims. (Cl. 156—402)

The present invention relates to a tire building machine which comprises a winding drum of variable diameter and also comprises slidable bodies arranged at both sides of said drum and likewise variable in diameter. The said s'idable bodies which are adapted to surround the winding drum are movable in an axial direction of the winding drum and are adapted when moving toward the winding drum to grasp the marginal portion of the fabric layers forming the tire carcass from the inside of said layers and to loop said marginal portions about the bead cores of the tire.

With a heretofore known tire building machine of this type, the end faces of the winding drum are provided with supporting portions for the tire beads. It is into these supporting portions where the bead cores must be moved when the winding drum has received the bead cores and has increased its diameter for arresting said cores. The movement of the bead cores in the above mentioned heretofore known tire building machine of the type involved is effected by means of slidable bodies which also loop the marginal portions of the fabric layers about the bead cores.

However, it has been found that with tire building machines of the above mentioned type, when building relatively large tires, a considerable force is required for displacing the bead cores and that relatively strongly dimensioned slidable bodies are required. This is due primarily because said slidab'e bodies must have a considerable axial length in order to be able to loop the marginal portions of the fabric layers around the bead cores in such a way that the ends of the fabric layers will be located approximately at the central peripheral portion of the drum. Furthermore, a movement of the bead cores by means of said slidable bodies can be effected only when lifting means are provided which lift the slidable bodies after the displacement of the bead cores has been effected and said bead cores have reached their proper location at the end faces of the winding drum.

It is, therefore, an object of the present invention to provide a tire building machine which will overcome the above mentioned drawbacks.

It is another object of the present invention to provide a tire building machine which wi'l make the lifting means for the free ends of the movable bodies superfluous while simultaneously bringing about a relief of the slidable bodies.

These and other objects and advantages of the invention will appear more clearly from the following specification in connection with the accompanying drawings in which:

FIG. 1 is a diagrammatical representation of a tire bui'ding machine according to the invention showing the same partly in view and partly in section.

FIG. 1a illustrates a detail of the tire building machine of FIG. 1.

FIGS. 2 to 4 illustrate the various stages of the machine and steps in connection with the completion of a tire carcass.

FIG. 5 represents a slight modification of the outer contour of a member in the tire building machine of FIG. 1.

*General arrangement*

The machine according to the present invention is characterized primarily in that ring members variable in diameter and arranged at both ends of the winding drum or at least a p'urality of segments distributed over the circumference of the winding drum have those ends thereof which face the drum provided with a step for receiving the tire bead cores and are movable toward the drum. The said ring members are advantageously so designed that they can also support the free ends of the movable members for effecting the looping of the fabric layer marginal portions about the bead cores so that said movable members will safely be supported by said ring members when the marginal portions of the fabric layers are being looped around the bead cores.

For purposes of bui'ding up the tire, the bead cores are so arranged with regard to said ring members which are variable in diameter that the bead cores will be located above the said steps in the ring members or in other words will surround said steps. By increasing the diameter of said ring members, the bead cores will be located in said steps of the ring members so that the ring members when moving in axial direction toward the drum will be able to move the cores into recesses or supporting portions provided at the end faces of the winding drum.

*Structural arrangement*

Referring now to the drawing in detail, the structure shown therein comprises a winding drum generally designated W which is composed of sections *a* and *b* interconnected by a sleeve 25. Each of the sections *a* and *b* is composed of segments 1. The structure shown in the drawings furthermore comprises axially movable bodies 15 which may be of a design similar to that disclosed in assignee's copending application Serial No. 636,744, filed January 28, 1957 and may be actuated in the manner likewise described in the said copending application. The fabric layers forming the carcass of the tire are designated with the reference numeral 19, while the bead cores are designated with the reference numeral 3.

The winding drum and, more specifica!ly, the segments 1 forming the winding drum have their outwardly directed end faces provided with a recess 46 the surface 47 of which extends substantially in the direction of the longitudinal central axis 48 of the drum. However, the surface 47 may instead also be slightly inclined with regard to the axis 48 so as to form a recess of a truncated cone-shape with the surface 47 forming an angle with the axis 48 of up to approximate!y 15°. This inclination may be selected so that the maximum diameter will be located at the free ends of the segments 1. However, if desired, the inclination may be selected so that it tapers in the opposite direction, in other words the recess will be slightly undercut.

Near the free ends of the segments 1 there is arranged a profiled ring member 49 adapted to be expanded in radial direction so that its diameter will be increased. The ring member 49 has that end thereof which faces the segments 1 provided with a step 50 for receiving the cores 3. The opposite end of the ring member 49 has an inclined surface 52*a*. The surface 52*a* is generally not effective inasmuch as the axially movable bodies 15 rest upon the outer surface 52 of the ring member 49. As will be evident from the drawings, the ring member 49 is located adjacent the outwardly directed end of the sections *a* and *b* composed of the segments 1. The ring members 49 which are coaxially arranged with regard to the winding drum W, likewise consist of segments similar to the segments of the drum W and may be of a design similar to that described in assignee's copending application Serial No. 636,744. However, the ring members 49 instead of being built up from segments may also consist of an elastic inflatable body. The ring members 49 are movable in the direction of the axis 48 in a convenient manner.

The tire carcass may be built up in the following manner. The fabric layers 19, as indicated in FIG. 1, are first wound upon the segments a and b in such a manner that the edge portions of the fabric layers 19 will rest on the hollow drum-like axially movable bodies 15 which are preferably composed of segments. The rollers 53 at the inner ends of the bodies 15 will rest upon the surface 52 of the ring members 49. Thereupon the tire or bead cores 3 are so arranged that they will surround the surface 54 of the steps 50.

In conformity with the next step, the diameter of the winding drum and the diameter of the ring members 49 is increased whereby the fabric layers 19 are deformed and the surface 54 will contact the fabric layers 19, while the cores 3 will be rested in the steps 50.

In order to avoid any damage of the fabric layers 19, it may be advantageous to reduce the effective length of the winding drum when the diameter of the winding drum is increased in conformity with FIG. 2. Advantageously, the relative distance between the sections a and b is reduced when the diameter of the winding drum is increased in order in this way to compensate for the reduction in the width of the layers 19 when the same are stretched in radial direction. The axial movement of the drum defining members may be effected in any convenient manner, for instance in the manner described in assignee's copending application Serial No. 636,744.

By moving the ring members 49 in the direction toward the winding drum W, the cores 3 will be brought into proper position and will be moved into the recess 46 of the segments 1. Thereupon, first one of the two axially movable bodies 15 is moved up to the central portion of the drum W, i.e. into the range of the sleeve 25 whereby the adjacent ends of the fabric layers 19 are looped around the respective core 3. After the thus moved body 15 has reached the position shown in FIG. 3, the oppositely located body 15 at the other end of the drum W is moved toward said drum in a corresponding manner to loop the respective adjacent other end of the layers 19 around the other core 3.

Following this procedure, the ring members 49 are in conformity with FIG. 4 together with the bodies 15 moved toward the left and toward the right with regard to FIG. 1. Simultaneously, with this movement or prior or subsequent thereto, the diameter of the bodies 15 and 49 is reduced so that the elements 15 and 49 will again occupy the position shown in FIG. 1. The laterally outwardly located surfaces at the bead portions of the tire may now be covered for instance with so-called bead or tire cloth a' as shown in FIG. 4, inasmuch as these portions of the carcass are freely accessible.

By moving the sections a and b of the drum W toward each other and by reducing the diameters thereof, the tire carcass becomes free and can now easily be removed from the winding drum.

In order to be able to effect as small changes in the diameter as possible, and in order to avoid the formation of folds in the fabric layers 19 above the rollers 53, it is expedient to provide those ends of the ring members 49 which are remote from the winding drum with a recess 55 (FIG. 5) for receiving the rollers 53 of the axially movable bodies 15. In order to be able to move the bodies 15 over the humps 56 while employing a low force, the recess 55 is formed expediently by a curved or plane surface gradually ascending in the direction toward the hump 56.

It is expedient to arrange and locate the bodies 15 as described in connection with the assignee's copending application Serial No. 636,744.

It is, of course, to be understood that the present invention is, by no means, limited to the particular construction shown in the drawings but also comprises any modifications within the scope of the appended claims.

What we claim is:

1. In combination in a tire building machine: a tire building drum of variable diameter for receiving fabric layers for forming a tire carcass, and having its opposite end faces provided with axially inwardly extending recess means for receiving bead cores, a pair of first annular means for setting bead cores in said recess means and of variable diameter respectively arranged at opposite ends of said drum and substantially coaxial therewith, said first annular means being movable selectively toward said drum or away therefrom for conveying bead cores into said recess means, those ends of said first annular means which face the end faces of said drum being provided with reduced diameter projections forming bead core receiving portions of step-shaped cross section for receiving the portions of fabric extending beyond the ends of the drum and underlying the bead cores and for receiving the bead cores on said portions of fabric, said first annular means being movable axially toward the drum to dispose said projections in said respective adjacent recess means of said drum for moving said portions of fabric and the bead cores thereon into said recess means, and a plurality of second annular means respectively arranged at opposite ends of said drum for folding the marginal portions of the fabric layers on the drum back over the drum, said second annular means having radially outwardly yieldable means at the ends toward the drum resting on the outer surface of the adjacent said first annular means, said second annular means being movable axially over the respective adjacent first annular means and over respective adjacent portions of said drum whereby the respective fabric portions extending outwardly from said first annular means are lifted by said second annular means and folded over the respective adjacent bead cores.

2. A tire building machine according to claim 1, in which each of said second annular means is composed of circumferentially arranged segments pivotally supported at their ends opposite said drum whereby their ends adjacent said drum can move relatively in moving over the drum.

3. A tire building machine according to claim 1, in which each of said first annular means has a peripheral surface portion for supporting the end of the pertaining said second annular means nearest the drum during its movement toward said drum.

4. In combination in a tire building machine: a tire building drum of variable diameter for receiving fabric layers for forming a tire carcass, the opposite ends of said drum having axial peripheral flanges defining bead core receiving recess means adapted for receiving a bead core therein, a pair of first annular means of variable diameter respectively arranged at opposite ends of said drum and substantially coaxial therewith, said first annular means being movable selectively toward said drum or away therefrom for conveying bead cores into said recess means, those ends of said first annular means which face the end faces of said drum being provided with reduced diameter axial projections forming bead core receiving portions of step-shaped cross section adapted for receiving a bead core thereover, and a plurality of second annular means respectively arranged at opposite ends of said drum for receiving thereover the marginal portions of fabric layers on the drum and including cantilever-shaped segmental portions having their free ends toward said drum movable radially outwardly so as to slide over the drum and also movable in axial direction of said drum over the respective adjacent first annular means and thence over the respective drum portion whereby the respective fabric portions adjacent said first annular means and overlying said second annular means are lifted by said second annular means and folded over the respective adjacent bead cores, said first annular means being provided with cam surface means for supporting the free ends of said segments during the movement of the latter toward said drum, said cam surface means flaring outwardly toward said drum for gradually lifting said free ends in radial outward direction during the movement of said segments toward said drum, said first annular means being collapsible to permit bead cores to be placed thereover at the opposite ends of said drum and being expansible to engage the insides of the bead cores, and also being axially movable to place the bead cores in said recess means.

References Cited in the file of this patent

UNITED STATES PATENTS

| | | |
|---|---|---|
| 1,762,856 | Desautels | June 10, 1930 |
| 2,035,422 | Breth | Mar. 24, 1936 |
| 2,313,035 | Breth | Mar. 9, 1943 |
| 2,335,169 | Bostwich | Nov. 23, 1943 |
| 2,409,974 | Breth et al. | Oct. 22, 1946 |
| 2,565,071 | Frazier | Aug. 21, 1951 |
| 2,743,760 | Backadolph et al. | May 1, 1956 |
| 2,814,330 | Vanzo et al. | Nov. 26, 1957 |
| 2,814,331 | Vanzo et al. | Nov. 26, 1957 |

FOREIGN PATENTS

| | | |
|---|---|---|
| 542,810 | Great Britain | Jan. 28, 1942 |